(12) United States Patent
Glimpel et al.

(10) Patent No.: US 7,625,292 B2
(45) Date of Patent: Dec. 1, 2009

(54) COMBINATION TOOL WITH FRONT-FACE RECESS

(75) Inventors: Helmut Glimpel, Lauf (DE); Dietmar Hechtle, Pegnitz (DE)

(73) Assignee: EMUGE-Werk Richard Glimpel GmbH & Co. KG Fabrik für Präzisionswerkzeuge, Lauf (DE)

( * ) Notice: Subject to any disclaimer, the term of this patent is extended or adjusted under 35 U.S.C. 154(b) by 305 days.

(21) Appl. No.: 11/682,160

(22) Filed: Mar. 5, 2007

(65) Prior Publication Data

US 2007/0207865 A1   Sep. 6, 2007

(30) Foreign Application Priority Data

Mar. 6, 2006 (DE) .................. 10 2006 010 651

(51) Int. Cl.
  *B21J 13/02* (2006.01)
(52) U.S. Cl. ...................... 470/199; 408/222

(58) Field of Classification Search ................. 470/198, 470/199, 204; 29/281; 408/139; 409/74
See application file for complete search history.

(56) References Cited

U.S. PATENT DOCUMENTS

| 4,761,844 A * | 8/1988 | Turchan ...................... 470/199 |
| 6,345,941 B1 * | 2/2002 | Fang et al. ...................... 409/74 |

\* cited by examiner

*Primary Examiner*—Dana Ross
*Assistant Examiner*—Stephanie Jennings
(74) *Attorney, Agent, or Firm*—Workman Nydegger

(57) ABSTRACT

A tool for producing a thread such as an internal thread, can include at least one cutting region having at least one cutting edge and at least one thread-forming region. In general, the cutting region(s) and the thread-forming region(s) are coupled or connected to one another in such a way that they are rotatable or rotate together about a tool axis. In addition, at least one cutting region is at least partly formed on a front-face tool end and/or adjacent to a front-face tool end. Furthermore, a front-face recess that is configured for receiving chips is formed on the front-face tool end.

20 Claims, 2 Drawing Sheets

COMBINATION TOOL WITH FRONT-FACE RECESS

CROSS-REFERENCE TO RELATED APPLICATIONS

The present invention claims the benefit of priority under 35 U.S.C. § 119 to German Patent Application No. 10 2006 010 651.2, filed on Mar. 6, 2006, having a translated title of "COMBINATION TOOL WITH FRONT-FACE RECESS," which is incorporated herein by reference in its entirety.

BACKGROUND OF THE INVENTION

1. The Field of the Invention

The invention relates to a tool for producing a thread, in particular an internal thread.

2. Background and Relevant Art

For thread production, in particular for producing threads for screwed connections, tools working with a cutting action and tools working with a chipless action are known.

Tools working with a cutting action have cutting edges. This group includes drills, which process a workpiece in particular with a continuous cut or with continuous engagement of the cutting edges in the material, and milling cutters, which process the workpiece in particular with a discontinuous or interrupted cut or with discontinuous engagement of the cutting edges in the material.

For chipless (or: forming) thread production, thread-producing tools are known which are based on forming of the workpiece and produce the thread in the workpiece by pressure. Coming within the scope of these chipless thread producers are "thread formers" in which pressing lobes (or: forming wedges) projecting outward are used for forming the material of the workpiece.

The tools normally have a tool shank and a working region formed on said tool shank. The tool shank is at least of approximately cylindrical design as a rule, and is accommodated and held in the chuck of a thread-producing device. The working region has the cutting or non-cutting features, for example cutting edges or pressing lobes, provided for the thread production or rework.

To produce a thread in an already existing bore, the tool, with the working region in front, is inserted into the workpiece or bore in the workpiece with a corresponding feed axially-relative to the longitudinal axis of the tool shank, and while rotating about this longitudinal axis. In the process, the cutting edges or pressing lobes are pressed into the surface of the workpiece or the bore. The cutting features (cutting edges) remove material in the process, and the non-cutting features (pressing lobes) press the material of the workpiece away mainly radially, that is to say perpendicularly to the longitudinal axis of the bore or to the tool axis. In the latter case, some of the material deformed in this way is consolidated; another portion is forced into the depressions or furrows between the pressing lobes of the thread former, as a result of which a thread is finally produced in the workpiece.

Both cutting and forming regions may be designed specifically for purely axial processing of the workpiece; that is to say, the respective working region or the tool is merely rotated about the tool axis, and moved into the workpiece with an axial feed. Furthermore, both cutting and forming working regions may be designed specifically for circular processing of the workpiece; that is to say, in addition to the rotation about the tool axis and the feed into the workpiece, the respective working region or the tool is also rotated in a circular manner about a further axis running parallel to the tool axis and offset from the tool axis. In addition to its own rotation, the tool therefore performs a spiral movement into the workpiece.

For purely axial processing, the cutting or forming features are normally arranged on the tool in such a way as to run at least essentially spirally around the tool axis, that is to say with a pitch along the tool axis. This arrangement ultimately constitutes the mating form of the thread to be produced; the pitch of the arrangement constitutes the thread pitch. For a circular movement, however, the arrangement is normally annular, that is to say without a pitch.

The advantage of the chipless tools is that, due to the deforming of the surface and the consolidation associated therewith, the hardness of the material in the region of the thread profile increases and thus a more wear-resistant thread is produced. However, a disadvantage with purely chipless thread production, that is to say, with thread production in which the thread is formed entirely by means of the pressing lobes, is the high loads and the associated high wear of the pressing lobes.

In order to reduce this load, it is therefore known to initially produce the thread in a prior operation. The thread may be initially produced by a cutting tool, so that the advantages of cutting and chipless thread production can be combined in this two-stage process for thread production. In this case, however, at least two separate operations using different tools are necessary.

Furthermore, Patent Application DE 10 2005 022 503.9 has disclosed a combination tool which works with both a cutting and a chipless action, and, to this end, has at least one cutting edge and at least one thread-forming region. With such a tool, the combined, that is to say both cutting and forming, thread production can be carried out by a single tool in one operation in a time and cost-saving manner. A disadvantage in this case, however, is that workpiece chips produced by the cutting region may be pressed into the thread by the following thread-forming region, which may lead to undesirable defects in the thread.

BRIEF SUMMARY OF THE INVENTION

Implementations of the present invention, therefore, provide a novel tool for producing a thread, in particular for producing an internal thread, in which tool the aforesaid disadvantages are overcome or at least reduced. The features of one or more implementations are identified in the present specification and claims. For example, at least one implementation in accordance with the present invention includes a tool for producing a thread, in particular an internal thread, which comprises: a) at least one cutting region having at least one cutting edge; and b) at least one thread-forming region.

This is therefore a combination tool. In this tool: c) the cutting region(s) and the thread-forming region(s) are coupled or connected to one another in such a way that they are rotatable or rotate together about a tool axis, d) at least one cutting region is at least partly formed on a front-face (free) tool end and/or adjacent to a front-face (free) tool end, e) front-face recess (or: front-face cutout) which is intended for receiving chips is formed on the front-face tool end.

A predetermined feed direction axially relative to the tool axis is normally excellent for the tool, in particular at least one cutting region or the arrangement of its at least one cutting edge and its at least one thread-forming region. As a rule, the front-face (free) tool end moves in this feed direction, that is to say the front-face (free) tool end is the end of the tool in a predetermined feed direction of the tool. The opposite end is normally clamped in a clamping device of the machine tool.

The chips, which the front-face recess is intended to receive, are workpiece chips which are produced during the cutting processing of the workpiece by the cutting region (or its cutting edges).

The advantages of the tool according to the invention lie in particular in the fact that chips produced during the machining of the workpiece by the cutting region can collect in the front-face recess; and can thus no longer pass into the thread-forming region, and can therefore also no longer be pressed there into the thread during the forming. Furthermore, this tool also has all the above-described advantages of combined production by cutting and forming operations and the described advantages of a combination tool.

In the tool, a direction of rotation in which the tool is operated, or for which at least one cutting region or the arrangement of its at least one cut-ting edge is designed, is generally excellent. The at least one thread-forming region likewise works in this direction of rotation.

According to a preferred development, the front-face recess, starting from the front-face tool end, extends along the tool axis and/or against the feed direction of the tool into the tool.

In an embodiment variant, the front-face recess, starting from the front-face tool end, extends essentially frustoconically or cylindrically into the tool.

A further embodiment provides for the cross-sectional area of the front-face recess perpendicularly to the tool axis, at least at the front-face tool end, to take up at least 30 percent of the tool cross-sectional area, in particular at least 50 percent, preferably at least 70 percent. Provision may additionally be made for the cross-sectional area of the front-face recess to decrease with increasing distance from the front-face tool end.

In an expedient variant, the front-face recess extends deeper into the tool than a cutting edge and/or a cutting-edge row, adjoining the front-face tool end, of the cutting region, in particular deeper than half the length of the cutting region adjoining the front-face tool end. There is thus sufficient space in the front-face recess for the chips that are to be received.

It is also expedient if the front-face recess is formed in the center of the front-face tool end, and/or is surrounded radially by a shell. According to a preferred and especially expedient development, the shell radially surrounding the front-face recess has one or more apertures which enable chips to enter the front-face recess. In their basic function, these apertures correspond to the grooves in conventional cutting tools, that is to say they serve for the chip removal. However, the chips are fed via the apertures to the front-face recess and are not directed—as in the case of the grooves of conventional tools—to the rear part of the tool. It is also expedient here if the apertures precede the cutting edges of the cutting region in their cut-ting direction.

According to an embodiment variant, the apertures, starting from the front-face tool end, extend along the tool. The apertures may also be ex-tended parallel to the cutting-edge arrangement along the tool.

Alternatively or additionally, provision may be made for the apertures to extend rectilinearly, in particular parallel to the tool axis, and/or obliquely and/or spirally wound about the tool axis.

In a first variant of the tool according to the invention, at least one cutting region is suitable and intended for producing or preparing a workpiece surface for the thread, and at least one thread-forming region is then provided for the chipless production of the thread by said thread being pressed into or formed in this workpiece surface.

In a second variant, which can also be combined with the first variant, at least one cutting region is suitable and intended for the cutting production of a pre-thread (or: rough thread) in the (or a) workpiece surface for the thread, and at least one thread-forming region is then provided for the chipless rework, in particular for the smoothing and further shaping, of the pre-thread by the latter being pressed into or formed in the workpiece surface. The workpiece surface therefore already has a pre-thread before the forming process.

With the tool in the first variant, it is also possible to produce a thread in the solid material of the workpiece, since the cutting region produces the workpiece surface for the thread-forming region by material removal from the work-piece itself. It is therefore not necessary to pre-machine the work-piece, in particular to initially produce a bore (core hole) in the case of an internal thread, even though it is of course additionally possible.

The combination of the two variants includes, in particular, the possibility that a first cutting region prepares by material removal the workpiece surface, in particular, the generally-cylindrical wall sections of the workpiece as an inner wall for an internal thread, a second cutting region makes the pre-thread in this workpiece surface prepared by the first cutting region, and finally at least one thread-forming region reworks or finishes the pre-thread with a chipless action.

The cutting region for the cutting production of the workpiece surface in the first variant is preferably designed as a drill bit, in particular with a continuous cut or continuous engagement of the cutting edge(s) in the material of the workpiece.

In a similar manner, the cutting region for the cutting production of the pre-thread in the second variant is a tap in an advantageous embodiment and, therefore, works in particular with a continuous cut, or is a thread milling cutter in another embodiment and therefore works with an interrupted cut.

In a first basic embodiment, then, the tool can be moved only with the axial or linear feed movement in the feed direction relative to the workpiece.

In this embodiment with only axial feed, the thread-forming region preferably has a form which, during the movement of the thread-forming region composed of rotary movement and feed movement, is reproduced on the thread in the workpiece, that is in particular a basic form running spirally or helically around the tool axis and having the same pitch as the thread produced or to be produced. This shaping thread of the thread-forming region on the tool constitutes approximately the mating form for the thread to be produced in the workpiece and comprises a plurality of thread turns as a rule. A thread turn in this case corresponds to a revolution or a winding of the spiral or helical line around the tool. In longitudinal section or in the thread profile, the thread-forming region therefore has essentially a serrated form with alternating teeth and grooves. This embodiment of the thread-forming region corresponds to an axial thread-forming region.

The cutting region, then, can produce the workpiece surface or the pre-thread in a separate operation or also simultaneously with the same working movement as the thread-forming region. In the case of a separate working movement in a separate operation, the cutting region can first of all work axially or also in a circular manner independently of the working movement of the thread-forming region during the thread forming. In the case of a single working movement, the cutting region and the thread-forming region move synchronously. For example, the cutting region, as axial drilling region, can produce a bore or workpiece surface by an exclusively axial feed movement or, as a drilling region working in a circular manner, by a circular feed movement with respective rotation of the tool in the direction of cutting of the drilling region.

In principle, any desired types of cutting regions can be combined with any desired types of thread-forming regions in a combination tool, and special tools can thus be provided for the most varied applications.

In a development, a cutting region adjacent to the thread-forming region in the opposite direction to the feed direction may also be provided as additional cutting region for producing an entry region or orifice region, in particular enlarged relative to a thread core and in particular stepped or chamfered, of the thread.

Pressing lobes or forming wedges or forming teeth denote below the areas of the thread-forming region which penetrate at least partly into the work-piece surface in order to shape the thread. In this case, the pressing lobes or forming wedges usually decrease outward in their cross-section or taper radially outward. A thread-forming region may comprise a plurality of pressing lobes or forming wedges. The pressing or effective profiles of successive pressing lobes or forming wedges may vary; for example, they may change in width and/or in height and/or in graduation and may complement one another in particular to form a common or superimposed effective profile which is reproduced on the thread profile in the workpiece.

The tool axis is, as a rule, a longitudinal axis and/or main axis of inertia of the tool and/or an axis passing centrally through the tool. A tool shank of the tool is as a rule of essentially cylindrical shape, that is to say of essentially circular shape in cross-section, and is held and clamped or can be clamped at one end in a clamping device or a tool holder or a tool chuck of a machine tool. In addition to the circular shape, the tool shank may also have any other desired cross-sectional shapes. The tool shank may have an increasing or decreasing cross section and or a cross section varying in its shape along the tool axis.

The cutting region(s) and/or the thread-forming region(s) may be formed in one piece with the tool shank or may also be connected to the latter as prefabricated part(s), for example shrunk or brazed or welded or adhesively bonded or screwed in place. Furthermore, additional anti-wear coatings may be applied to the tool or its working regions. It is especially advantageous if the tool shank and the cutting part are produced from a tool steel, in particular a high-speed steel. This may be, for example a super high-speed steel (HSS steel) or a cobalt-alloy super high-speed steel (HSSE steel). The working regions are preferably produced from HSS, HSSE, HSSE-PM, carbide or a carbide alloy, in particular P grade or K grade, or cermet, or of sintered carbide, in particular of tungsten carbide or titanium nitride or titanium carbide or titanium carbonitride or aluminum oxide, or of a cutting ceramic, in particular polycrystalline boron nitride (PCBN) or of polycrystalline diamond (PCD), in particular as a coating or as, for example, strips brazed in place.

In a special embodiment, at least one thread-forming region preferably has in at least one section an outside diameter increasing, preferably conically or linearly, against the feed direction. The fact that the thread-forming region tapers in the feed direction has, for example, the advantage that the penetration of the first pressing lobes into the workpiece surface or the inner wall of the bore is facilitated. It may also be advantageous if at least one thread-forming region has an outside diameter which is uniform against the feed direction.

It is especially preferred if at least one thread-forming region has a region of increasing outside diameter against the feed direction, said region also being designated as a shaping region or initial-forming region, followed by a region of uniform outside diameter, also referred to as guide region or calibrating region. The guide region mainly serves to guide the tool in the thread, such that the force provided for the thread production in the shaping region is transmitted uniformly and thus as far as possible free of loss to the surface of the workpiece. At the same time, the guide region may have the function of smoothing and calibrating the produced thread surface or the thread flanks. As a result, the thread can be produced very accurately. In a similar manner, the cutting region may also have an initial-cutting region and a full-cutting region adjoining against the feed direction of the tool.

In an especially advantageous embodiment, one or more grooves and/or apertures and/or passages are provided in the tool at the circumference of a least one thread-forming region and/or of at least one cutting region for directing a fluid medium, in particular a coolant and/or lubricant and/or air, such as compressed air and/or cold air, in order to reduce the friction and/or the development of heat and to dissipate the heat produced, and/or to remove the chips (flutes) produced. The grooves and/or apertures and/or passages may run rectilinearly and/or parallel or axially relative to the tool axis and/or obliquely to the tool axis and/or in the longitudinal direction of the tool, or may also be designed in a twisted or helical form (helical grooves) about the tool axis, that is to say, so as to be twisted or rotated about the circumference of the tool or the tool axis.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

Figure 1:
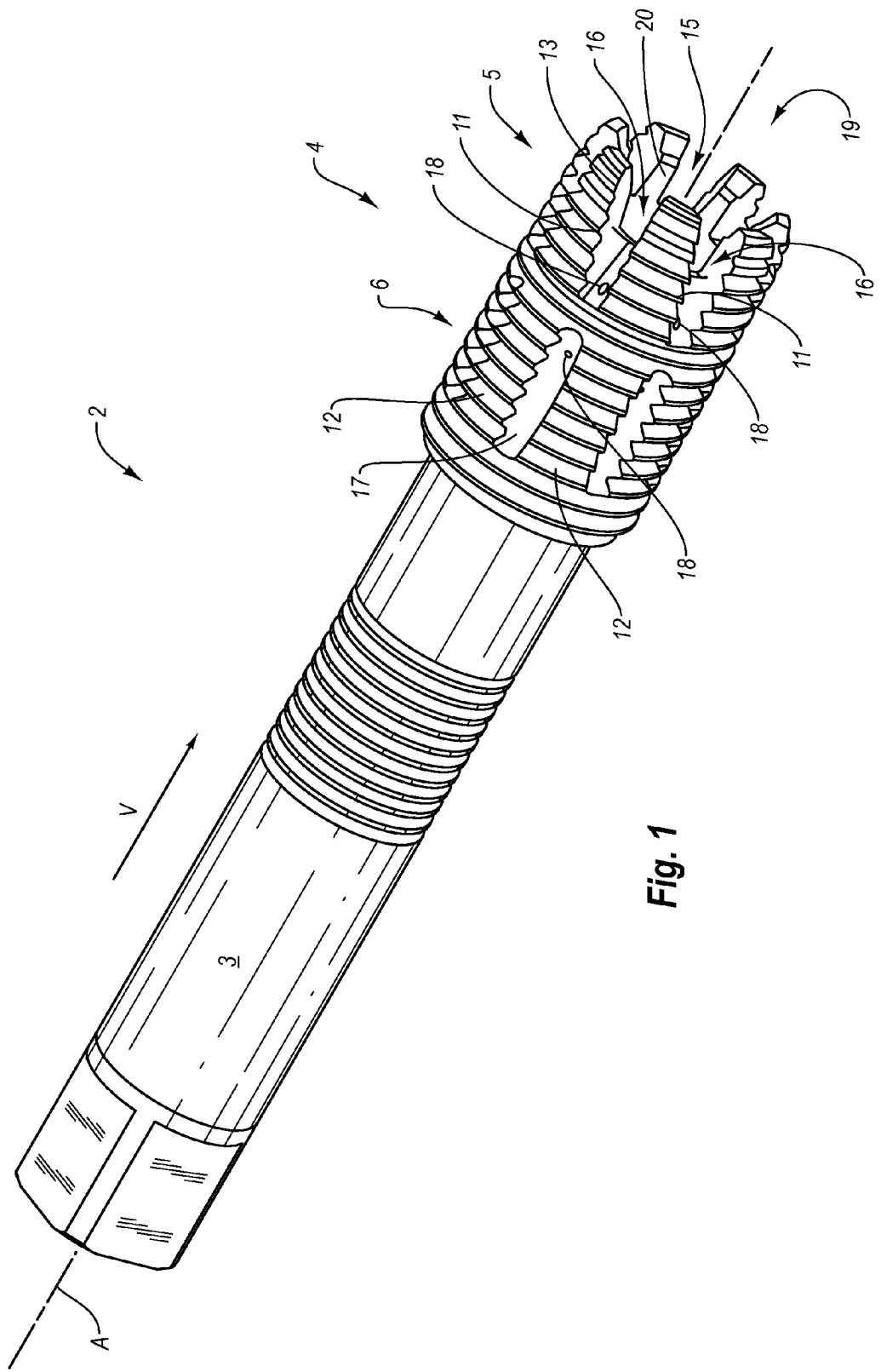
FIG. 1 illustrates an exemplary embodiment of a tool according to the invention in a perspective illustration.
Figure 2:
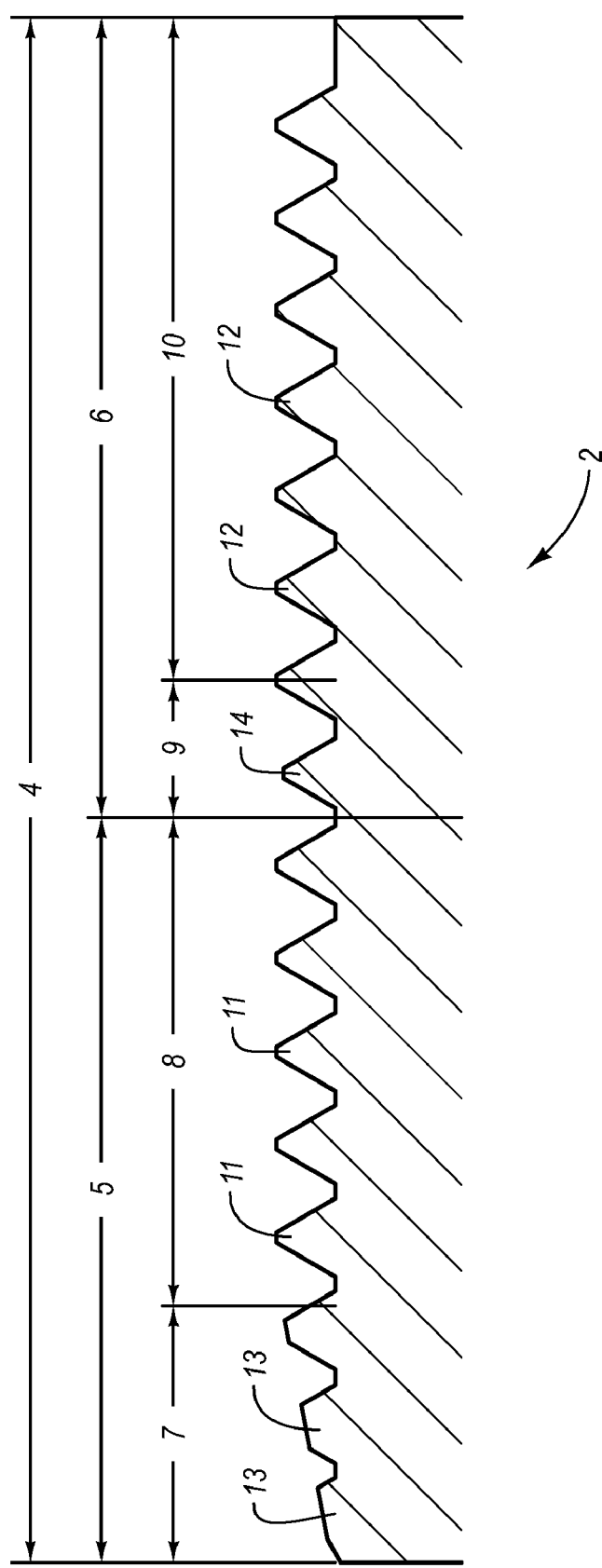
FIG. 2 illustrates a part of the working head of the tool according to FIG. 1 in a longitudinal section.

Parts and quantities corresponding to one another are provided with the same designations in FIGS. 1 and 2.

DETAILED DESCRIPTION OF THE PREFERRED EMBODIMENTS

FIG. 1 shows an exemplary embodiment of a tool 2 according to the invention in a perspective illustration, having a tool shank 3, a working head 4 arranged on the tool shank 3, a tool longitudinal axis A and an envisaged feed direction V for processing a workpiece. FIG. 2 shows, in a longitudinal section, part of the working head 4 of the tool 2 shown in FIG. 1.

The working head 4 of the tool 2 can be designed to be firmly connected to the shank 3, in particular in one piece with the shank 3. However, it is likewise possible to releasably-connect the working head 4 to the shank 3, for example by the working head 4 being designed as a detachable and thus interchangeable slip-on part.

The tool 2 is a combination tool, to be precise a thread-cutting/forming tool. The working head 4 comprises a cutting region 5, which may also be designated as cutting part, and a thread-forming region 6, which may also be designated as forming part. The cutting region 5 and the thread-forming region 6 are both rotatable about the tool axis A.

The cutting region 5 adjoins the front-face (free) tool end 19, which is the front end in the feed direction V of the tool 2, and the thread-forming region 6 adjoins said cutting region 5 against the feed direction V.

Numerous cutting edges 11, 13 (also: cutting teeth) are arranged as cutting elements in the cutting region 5. The cutting region 5 is subdivided into an initial-cutting region 7, here an initial-cutting taper 7, which adjoins the front-face tool end 19, and into a full-cutting region 8 adjoining said initial-cutting region 7 against the feed direction V of the tool 2. In the initial-cutting region 7, the cutting teeth are designed as rough-cutting teeth 13, having a smaller radial extent than the normal cutting edges 11, the outer radius (maximum radial distance from the tool axis) of the rough-cutting teeth 13 increasing against the feed direction V of the tool 2.

Numerous pressing lobs 12, 14 (or: forming wedges, forming teeth) are provided as forming elements in the thread-forming region 6. The thread-forming region 6 is subdivided into an initial-forming region 9, here an initial-forming taper 9, which adjoins the cutting region 5 against the feed direction V of the tool 2, and into a full-forming region 10 (or: guide region) adjoining said initial-forming region 9 against the feed direction V. In the starting region 9, the pressing lobes are designed as rough-forming teeth 14 having a smaller radial extent than the normal pressing lobes 12. The outer radius (maximum radial distance from the tool axis) of the normal pressing lobes 12 is slightly larger than the outer radius of the cutting teeth 11 in the cutting region 5.

At its front-face tool end 19, the tool 2 has a front-face recess 15 (or: front-face cutout). The latter is designed and intended for receiving chips which are produced during the cutting processing of the workpiece with the cutting edges 11, 13 of the cutting region 5. This prevents, at least to the greatest possible extent, chips from passing into the thread-forming region 6 and from being pressed there by the pressing lobes 12, 14 into the thread produced or to be produced in the workpiece and from hindering or preventing proper thread formation as a result.

Starting from the front-face tool end 19, the front-face recess 15 extends along the tool axis A into the tool 2 against the feed direction V of the tool 2. The cross-sectional area of front-face recess 15 perpendicularly to the tool axis A decreases with increasing distance from the front-face tool end 19. The shape of the front-face recess 15 is essentially approximately frustoconical. The front-face recess 15 extends over the initial-cutting taper 7 into the tool 2.

The front-face recess 15 is formed in the centre of the front-face tool end 19 and is surrounded radially by a shell 20. The cutting region 5 is arranged on this shell 20 radially on the outside. The shell 20 has a plurality of apertures 16 which enable chips to enter the front-face recess 15 starting from the cutting edges 11, 13. The apertures 16 each precede the cutting edges 11, 13 of the cutting region 5 in their cutting direction. Starting from the front-face tool end 19, the apertures 16 extend essentially rectilinearly along the tool 2 parallel to the tool axis A.

In their function, the apertures 16 largely correspond to the grooves in conventional cutting tools. The main task is in each case the removal of chips. The grooves transport the chip against a feed direction V of the respective tool into the rear region of the tool; the apertures 16, however, bring the chip into the front-face recess 15 established for receiving the chips.

Outlet openings 18 of an inner coolant feed are arranged in the apertures 16. Coolant can be directed to the cutting edges 11, 13 via these outlet openings 18 and the apertures 16.

Formed in the thread-forming region 6 are grooves 17, in which outlet openings 18 of the inner coolant feed are likewise arranged. Coolant is transported to the pressing lobes 12, 14 via these outlet openings 18 and the grooves 17.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

LIST OF DESIGNATIONS

2 Tool
3 Shank, tool shank
4 Working head
5 Cutting region, cutting part
6 Thread-forming region, forming part
7 Initial-cutting taper, initial-cutting region
8 Full-cutting region
9 Initial-forming taper, initial-forming region
10 Full-forming region, guide region
11 Cutting edge, cutting tooth
12 Pressing lobes, forming wedge, forming tooth
13 Rough-cutting tooth
14 Rough-forming tooth
15 Face recess, face cutout
16 Apertures
17 Groove
18 Outlet opening of an inner coolant feed
19 Front-face tool end, free end
20 Shell
A Tool axis, tool longitudinal axis
V Feed direction

We claim:
1. A tool for producing a thread, in particular an internal thread, comprising:
   a) at least one cutting region having at least one cutting edge; and
   b) at least one thread-forming region;
   wherein:
   c) the at least one cutting region and the at least one thread-forming region are coupled or connected to one another in such a way that they are rotatable, or rotate together, about a tool axis;
   d) the at least one cutting region is one or more of at least partly formed on a front-face tool end, or adjacent to a front-face tool end;
   e) a front-face recess configured for receiving chips is formed on the front-face tool end;
   f) the cross-sectional area of the front-face recess decreases with increasing distance from the front-face tool end; and
   g) the front-face recess is formed in the center of the front-face tool end.

2. The tool as claimed in claim 1, wherein one or more of:
the front-face recess, starting from the front-face tool end, extends along the tool axis into the tool; or
the front-face recess, starting from the front-face tool end, extends essentially frustoconically or cylindrically into the tool.

3. The tool as claimed in claim 1, wherein one or more of:
the cross-sectional area of the front-face recess perpendicular to the tool axis, at least at the front-face tool end, takes up at least 30 percent of the tool cross-sectional area;
or
the front-face recess extends deeper into the tool than a cutting edge or a cutting-edge row adjoining the front-face tool end of the cutting region, wherein the front-face recess extends deeper than half the length of the cutting region adjoining the front-face tool end.

4. The tool as claimed in claim 3, wherein the cross-sectional area of the front-face recess perpendicular to the tool axis, at least at the front-face tool end, takes up at least 50 percent of the tool cross-sectional area.

5. The tool as claimed in claim 3, wherein the cross-sectional area of the front-face recess perpendicular to the tool axis, at least at the front-face tool end, takes up at least 70 percent of the tool cross-sectional area.

6. The tool as claimed in claim 1, wherein the front-face recess is surrounded radially by a shell.

7. The tool as claimed in claim 6, wherein the shell radially surrounding the front-face recess has one or more apertures configured to enable chips to enter the front-face recess.

8. The tool as claimed in claim 7, wherein the apertures are formed to one or more of:
precede the cutting edges of the cutting region in their cutting direction;
extend along the tool, starting from the front-face tool end;
extend parallel to the cutting-edge arrangement along the tool; or
extend about the tool axis.

9. The tool as claimed in claim 8, wherein the apertures extend about the tool axis in one or more of:
a rectilinear fashion;
parallel to the tool axis;
obliquely; or
spirally wound.

10. The tool as claimed in claim 1, wherein:
a) the at least one cutting region is provided for one or more of:
producing a workpiece surface for the thread; or
cutting production of a pre-thread in the workpiece surface; and
b) at least one thread-forming region is provided for one or more of:
the chipless production of the thread; or
the chipless rework or finish processing of the pre-thread, respectively by pressing into or forming in the workpiece surface.

11. The tool as claimed in claim 1, wherein:
the at least one cutting region is designed for a predetermined direction of clockwise or counterclockwise rotation about the tool axis; and
the at least one thread-forming region is designed and arranged in such a way that the at least one thread-forming region reworks the pre-thread with the predetermined direction of rotation.

12. The tool as claimed in claim 1, wherein:
at least one cutting region, or the arrangement of its at least one cutting edge, is designed for a predetermined feed direction of the tool axially relative to the tool axis as viewed:
from the tool; or
toward the front-face end arranged axially relative to the tool axis of the tool; and
the at least one thread-forming region is designed and arranged to:
produce the thread; or
rework the pre-thread with the predetermined feed direction.

13. The tool as claimed in claim 1, wherein the at least one cutting region is a drilling region.

14. The tool as claimed in claim 1, wherein the at least one thread-forming region is a thread-forming region working exclusively by means of a rotary movement about the tool axis and an axial feed movement parallel to the tool axis.

15. The tool as claimed in claim 1, wherein one or more:
f) at least one cutting region and at least one thread-forming region are arranged one behind the other axially relative to the tool axis; or
e) the at least one cutting region has one or more of:
at least one front-face cutting edge or chamfer on the front-face tool end; or
at least one circumferential cutting edge on a circumferential region of the tool.

16. The tool as claimed in claim 1, wherein the tool is configured to work by means of a rotary movement about the tool axis and an axial feed movement parallel to the tool axis, the tool further comprising:
a) apertures for directing one or more of:
a fluid medium including one or more of a coolant, a lubricant, or air; or
the removed chips;
b) wherein the apertures open out at one or more of:
the circumference of the tool;
the interior of the tool;
the cutting region; or
the thread-forming region;
c) wherein the apertures open in a main direction that is one or more of:
parallel to the tool axis;
rectilinearly;
in a twisted manner;
helical about the tool axis; or
in the longitudinal direction of the tool.

17. The tool as claimed in claim 1, wherein the at least one thread-forming region and the at least one cutting region are formed on or attached to one or more of a common tool shank or a common tool core, and wherein the tool shank is provided for holding or clamping the tool in one or more of a tool holder or a tool chuck.

18. The tool as claimed in claim 1, wherein:
at least one thread-forming region has at least one pressing lobe or forming wedge projecting radially outward; and
the at least one pressing lobe or forming wedge is arranged along a curve encircling the tool axis in a spiral or helical manner.

19. The tool as claimed in claim 1, wherein at least one dimension of the tool is configured to one or more of:
increase or increase against a feed direction of the tool in an initial-forming region; or
be uniform in at least one guide region.

20. The tool as claim in claim 19, wherein the dimension of the tool is based on one or more of:
the radial distance from the tool axis;
the radial outer dimensions of at least one thread-forming region; or
the radial outer dimensions of pressing lobes following one another axially relative to the tool axis.

* * * * *